(12) United States Patent
Brandt et al.

(10) Patent No.: US 8,577,014 B2
(45) Date of Patent: Nov. 5, 2013

(54) SYSTEM AND METHOD OF MANAGING CALLS AT A CALL CENTER

(75) Inventors: Jeffrey L. Brandt, Cedar Park, TX (US); Philip T. Kortum, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1880 days.

(21) Appl. No.: 11/267,593

(22) Filed: Nov. 4, 2005

(65) Prior Publication Data
US 2007/0116230 A1     May 24, 2007

(51) Int. Cl.
*H04M 3/00*     (2006.01)

(52) U.S. Cl.
USPC ............ 379/265.01; 379/265.14; 379/266.01; 379/266.06

(58) Field of Classification Search
USPC ........ 379/265.01–265.14, 266.01–266.1, 309
See application file for complete search history.

(56) References Cited

U.S. PATENT DOCUMENTS

| | | | |
|---|---|---|---|
| 5,436,965 A * | 7/1995 | Grossman et al. | 379/266.08 |
| 6,002,760 A | 12/1999 | Gisby | |
| 6,138,008 A * | 10/2000 | Dunn et al. | 455/417 |
| 6,259,786 B1 * | 7/2001 | Gisby | 379/266.01 |
| 6,285,752 B1 * | 9/2001 | Rice | 379/266.07 |
| 6,678,718 B1 | 1/2004 | Khouri et al. | |
| 6,704,404 B1 | 3/2004 | Burnett | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 7,532,877 B2 * | 5/2009 | Lee et al. | 455/412.2 |
| 2001/0021948 A1 | 9/2001 | Khouri et al. | |
| 2002/0101977 A1 * | 8/2002 | Takeuchi et al. | 379/242 |
| 2002/0114432 A1 | 8/2002 | Shaffer et al. | |
| 2002/0165732 A1 | 11/2002 | Ezzeddine et al. | |
| 2003/0069937 A1 | 4/2003 | Khouri et al. | |
| 2003/0103619 A1 | 6/2003 | Brown et al. | |
| 2003/0130864 A1 | 7/2003 | Ho et al. | |
| 2004/0193475 A1 * | 9/2004 | Hemm et al. | 705/9 |
| 2004/0196856 A1 * | 10/2004 | Bondarenko et al. | 370/395.52 |
| 2005/0201547 A1 | 9/2005 | Burg et al. | |

* cited by examiner

*Primary Examiner* — William Deane, Jr.
(74) *Attorney, Agent, or Firm* — Tole Law Group, PC (57) ABSTRACT

The present disclosure is directed to a system and method to manage calls in a call center. The method includes receiving a call from a caller. The method also includes transmitting an estimated wait time to the caller. The method also includes prompting the caller with a wait option and a receive return call option. The method also includes prompting the caller with a schedule return call option when the caller selects the receive return call option.

23 Claims, 5 Drawing Sheets

SYSTEM AND METHOD OF MANAGING CALLS AT A CALL CENTER

FIELD OF THE DISCLOSURE

The present disclosure relates generally to managing calls at a call center.

BACKGROUND

Many companies employ call centers to provide information about products and services to their customers. Often, the demand for information becomes so high that the number of callers who contact a call center at any one time exceeds the number of available agents at the call center. Calls are placed in one or more queues that maintain the calls in a certain sequence, such as the order in which they were received at the call center. As an agent becomes available, the call that is at the first position in the queue is transferred to the agent. The positions of the remaining calls in the queue are then advanced.

Queues prevent call centers from turning callers away when their calls cannot be immediately answered. Nonetheless, a caller may be inconvenienced, by waiting on or near a particular telephone, until the call is transferred to an agent for service. Additionally, maintaining queues requires excessive hardware and manpower at the call center. Every call that is in queue in a call center takes up an available circuit and port, and complex scheduling of human resources and call patterns are required to maintain a "below xx minute" wait time at the call center.

DETAILED DESCRIPTION OF THE DRAWINGS

A system to manage calls in a call center is disclosed and includes a server having a processor and a memory accessible to the processor. A computer program is embedded in the memory and includes instructions to receive a call from a caller. The computer program also includes instructions to transmit an estimated wait time to the caller. The computer program also includes instructions to prompt the caller with a wait option and a receive return call option. The computer program also includes instructions to prompt the caller with a schedule return call option when the caller selects the receive return call option.

In another embodiment, a method of managing calls in a call center is disclosed and includes receiving a call from a caller. The method also includes transmitting an estimated wait time to the caller. The method also includes prompting the caller with a wait option and a receive return call option. The method also includes prompting the caller with a schedule return call option, when the caller selects the receive return call option.

Figure 1:
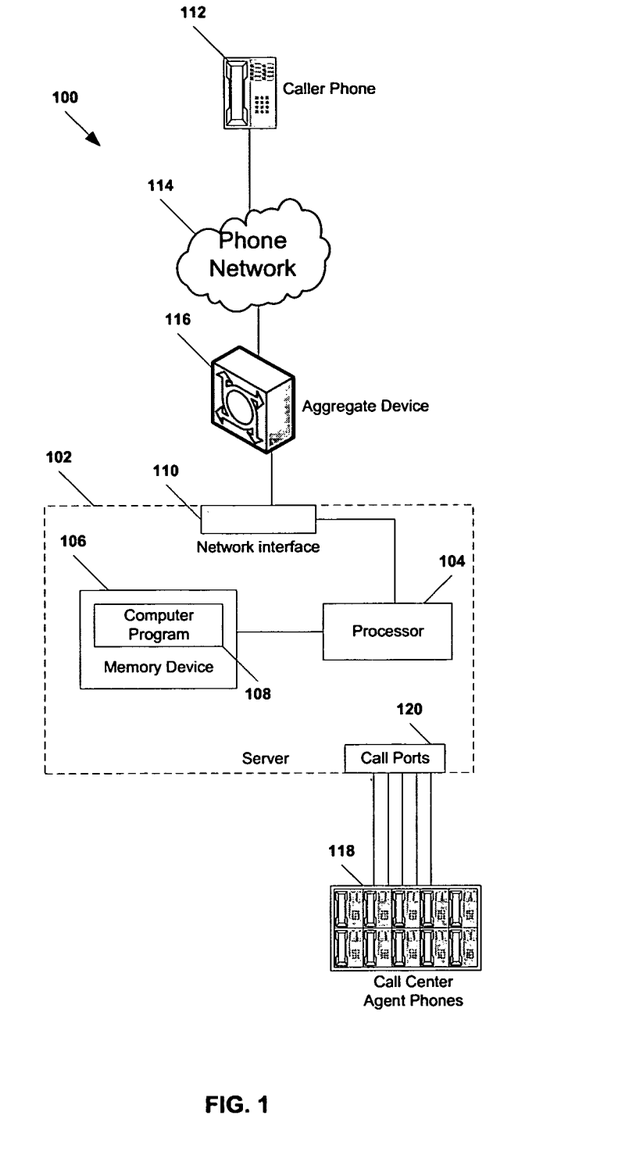
FIG. 1 is a block diagram illustrating an embodiment of a system to manage calls in a call center.

Referring to FIG. 1, a system to manage calls in a call center is shown and is generally designated 100. As shown, the system 100 includes a server 102. The server 102 includes a processor 104 and a memory device 106 that is accessible to the processor 104. In a particular embodiment, the server 102 communicates with a caller telephone 112 via a telephone network 114. For example, the phone network can comprise an Internet Protocol (IP) telephone network, a public switched telephone network (PSTN), a cellular network, a mobile phone network, or any other telephone network.

As depicted in FIG. 1, the server includes a network interface 110 that facilitates communication between the server 102 and the phone network 114. In an illustrative embodiment, the network interface 110 can communicate with the phone network 114 via an aggregate device 116, such as a router.

The server 102 also communicates with one or more call center agent telephony devices 118, which can be integrated with other communication means, such as e-mail, fax, online chat, and other means for communicating with customers or callers. In an illustrative embodiment, the server 102 can communicate with the call center agent phones directly, e.g., by connecting agent telephones with server ports 120. In another illustrative embodiment, the server 102 can communicate with the call center agent telephones via the network aggregate device 116.

As indicated in FIG. 1, the server 102 includes a computer program 108 that is embedded within the memory device 106. In a particular embodiment, the computer program 108 can contain instructions to maintain one or more queues that maintain calls received at the server 102 in a sequence, until they can be answered. For example, calls may be arranged in the order they were received, by the subject matter of each call, or by any other criterion that is suitable for arranging calls to be answered in a sequence.

The computer program 108 can also include instructions to receive a call from a caller. In an illustrative embodiment, the caller can use the caller telephone 112 to issue a call via the telephone network 114, and the call can be received at the server 102. Additionally, the computer program 108 can include instructions to determine whether at least one prior call is present in a queue maintained by the computer program 108. The computer program 108 can also include instructions to place a virtual call in the queue, when at least one prior call is present in the queue. The virtual call identifies the caller. Further, the computer program 108 can include instructions to issue a return call to the caller, when the virtual call is at a first position in the queue.

In a particular embodiment, the computer program 108 can also include instructions to allow the caller to select whether to receive the return call or to remain on hold in the queue. In an illustrative embodiment, the computer program 108 can include instructions to provide the caller with an estimated wait time. When the caller selects to receive a return call, the computer program 108 can place a virtual call in the queue. When the caller selects not to receive a return call, the actual call is placed in the queue and the caller can wait until the actual call is answered.

In a particular embodiment, the computer program 108 can further include instructions to receive caller identification information when receiving a call. The return call can be placed to a phone number identified by the caller identification information. In a particular embodiment, the computer program 108 can include instructions to prompt the caller for a return call telephone number, so the caller can leave the particular site from which the initial call is placed. For example, the call may be placed from a caller's home telephone, but the caller can submit a cell phone number for the return call.

Additionally, the computer program 108 can include instructions to issue the return call to the caller after a time period has expired. For example, when an estimated wait time has been communicated to the caller, the return call can be placed at the end of the estimated wait time. The computer program 108 can also include instructions to receive a specified time from the customer, and the return call can be issued at the specified time.

In another particular embodiment, the computer program 108 can include instructions to reissue a return call, if the caller does not answer a first return call. For example, return calls can be placed until a maximum number of tries has been reached. Further, the computer program 108 can include instructions to determine whether a maximum number of return calls have been issued to the caller and to issue no additional return calls when a maximum number of return calls is reached.

In yet another particular embodiment, the computer program 108 can include instructions to issue a return call to an alternate telephone number when a caller does not answer the initial return call. The alternate telephone number can be received from the caller or from caller identification information obtained when the caller places the initial call.

The computer program 108 can also include instructions to connect a call center representative to the return call when the caller answers the return call. Moreover, the computer program 108 can include instructions to connect a call center representative to the return call when the return call is placed. Additionally, the computer program can include instructions to communicate a prerecorded message when the caller answers the return call and to connect an agent to the return call, after the prerecorded message is communicated.

Figure 2:
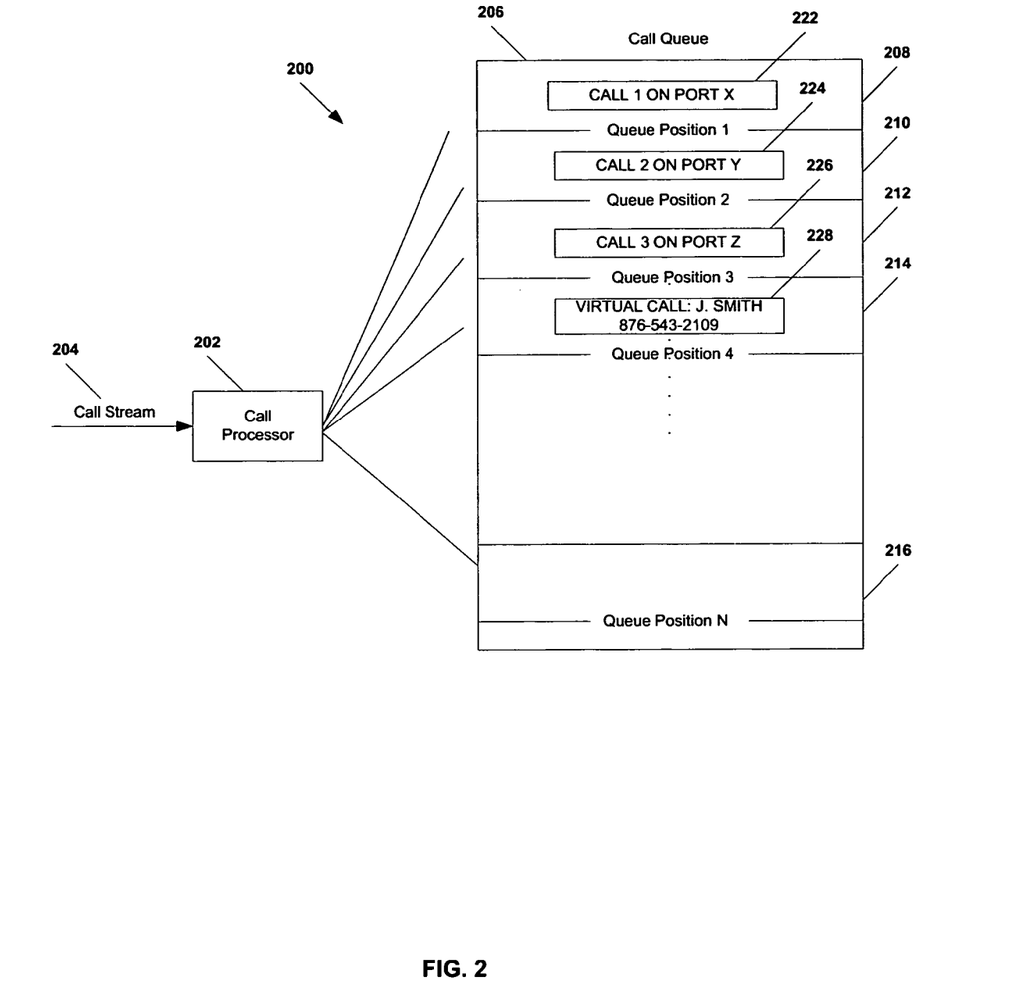
FIG. 2 is a block diagram illustrating a second embodiment of a system to manage calls in a call center.

Referring to FIG. 2, a second embodiment of a system to manage calls in a call center is shown and designated generally at 200. As shown, the system includes a call processor 202. In a particular embodiment, the call processor 202 processes a stream of calls received at a call center.

In a particular embodiment, when all agents at the call center are occupied with other calls, the call processor 202 can distribute calls to a call queue 206. In this embodiment, the call queue 206 can include a sequence of queue positions, such as a first queue position 208, a second queue position 210, a third queue position 212, a fourth queue position 214, and an Nth queue position 216.

As illustrated in FIG. 2, a first actual call 222 is located within the first queue position 208. A second actual call 224 is located with the second queue position 210. Further, a third actual call 226 is located with the third queue position 212. In an illustrative embodiment, the first actual call 222 is at the head of a queue, e.g., within the first queue position 208. As such, the first actual call 222 is the next call that will be transferred to an available agent. Once the first actual call 222 is transferred to an agent, each other call in the call queue 206 is transferred toward the first queue position 208. For example, the second actual call 224 can be advanced by one position from the second queue position 210 to the first queue position 208. Likewise, the third actual call 226 can be advanced by one position from the third queue position 212 to the second queue position 210.

In a particular embodiment, the virtual call 228 can be received at the call queue 206 and placed within the fourth queue position 214. The virtual call 228 corresponds to a call received from a caller who chooses to receive a return call from the call center. The virtual call 228 identifies the caller and may contain return call information received from the caller and/or caller ID information. In this embodiment, the virtual call 228 is advanced through the call queue 206 in the same manner as the prior calls that are ahead of the virtual call 228 in the call queue 206, such that the virtual call 228 reaches the first queue position 208 after all prior calls have been transferred to available agents. Once the virtual call 228 reaches the first queue position 208, the return call can be placed to the caller.

In another particular embodiment, the virtual call 228 can be placed at the first queue position 208 when a time scheduled by the caller is reached, such as 4 p.m. In another particular embodiment, the virtual call 228 can be placed at the first queue position 208 when an amount of time after the time the call is received from the caller has elapsed, such as 2 hours 30 minutes. Once the virtual call 228 is placed at the first queue position 208, the return call can be placed to the caller.

In an illustrative, non-limiting embodiment, the system 200 can employ predictive modeling to anticipate when an agent will become available. The call processor 202, or hardware or software communicating with the call processor 202, may contain logic or instructions to predict when one or more agents connected with the system 200 will become available. In this embodiment, a return call can be initiated before the virtual call 228 reaches the first queue position 208, such that the caller may be connected with the system 200 when a next agent becomes free, or shortly prior to the next agent becoming free. For example, the system 200 may predict that four agents will come free within seconds of each other. The system 200 can initiate a return call to the caller, even though the virtual call 228 is at the fourth position in the queue 206. Though the virtual call 228 is not at the first position in the queue 206, an agent is likely to be connected with the return call when the caller answers, or shortly thereafter.

Figure 3:
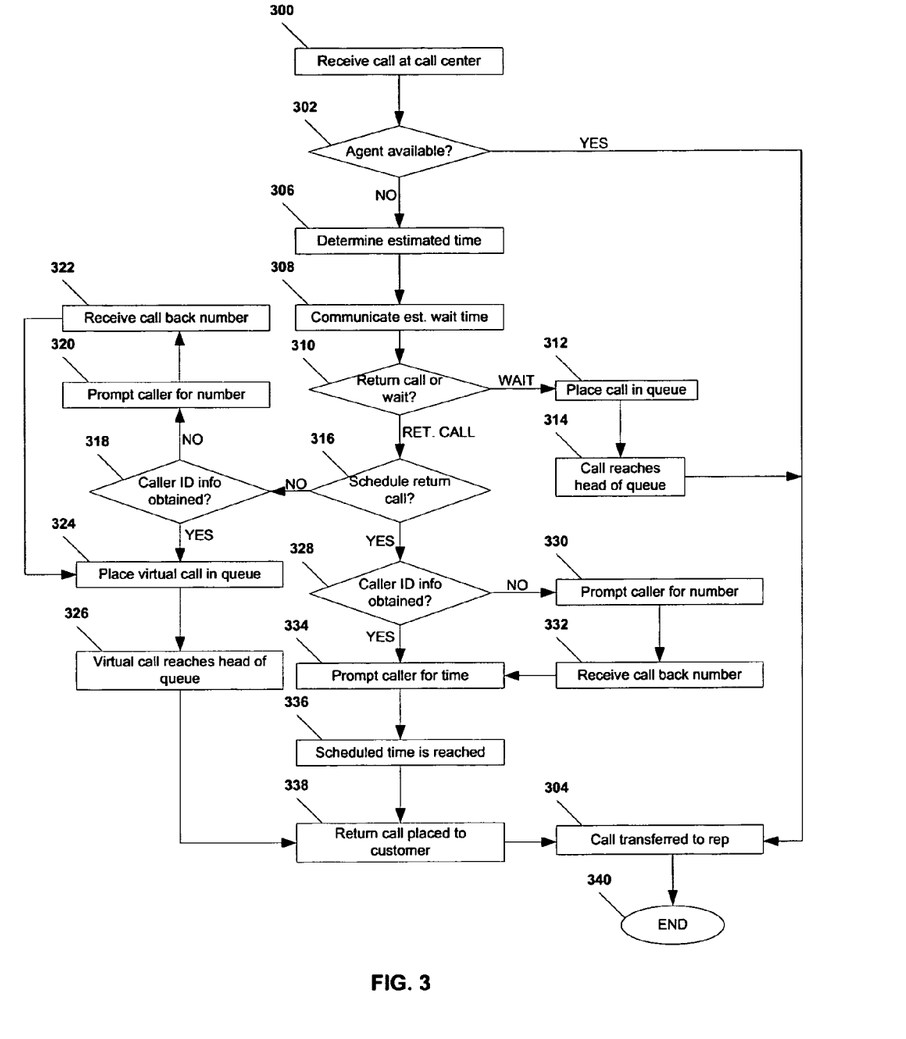
FIG. 3 is a flow diagram illustrating an embodiment of a method of managing calls in a call center.

Referring to FIG. 3, a method of managing calls in a call center is shown. At block 300, a call is received at a call center. In an illustrative embodiment, the call can be received at a server from a caller telephone, via a telephone network. At decision step 302, it is determined whether a representative or an agent in the call center is available. If an agent is available, the method proceeds to block 304 and the call is transferred to the available representative.

In a particular embodiment, if all agents at the call center are busy handling other calls, the method can proceed to block 306. At block 306, an estimated wait time can be determined. The estimated wait time can be a time after which a call center representative is estimated to become available. The estimated wait time can be communicated to the caller at block 308. In another embodiment, if the call center is not staffed, such as on a weekend, holiday, or before or after business hours, the next date and time that the call center will be staffed can be communicated to the caller at block 308.

Moving to decision step 310, the caller is prompted with a wait option and a return call option. When the caller selects the wait option, the call can be placed in a queue maintained by the call center, at block 312. As representatives answer other calls in the queue, the call advances toward a head of the queue. Eventually, the call reaches the head of the queue at block 314, such that it is the next call to be handled by a representative. The call is transferred to an available representative at block 304.

Returning to decision step 310, when the return call option is selected, the method proceeds to decision step 316 and the caller is prompted to determine whether the caller wants to schedule a time for the return call. When the caller decides not to schedule a time for the return call, the method moves to decision step 318. If caller identification information is not received, the caller can be prompted for a return call number at block 320, and the number can be received at block 322. The method can then proceed to block 324. In a particular embodiment, a caller may still enter an alternate return call number even if caller identification information is received.

Returning to decision step 318, when caller identification information is received, the method also proceeds to block 324. At block 324, a virtual call that identifies the caller is placed in a queue maintained by the call center. As each call that is ahead of the virtual call in the queue is answered by a call center representative, the position of the virtual call advances in the queue. Ultimately, the virtual call reaches the head of the queue, at block 326, such that it is the next call to be handled by an available agent. Moving to block 338, a return call is placed to the caller. In a particular embodiment, the return call can be placed to a telephone number identified in the caller identification information or a callback number provided by the caller.

In an illustrative, non-limiting embodiment, a return call can be placed before the virtual call reaches the head of the queue. For instance, a call processor at the call center, or hardware or software communicating with the call processor, may contain logic or instructions to model or predict when one or more agents connected with the call center will become available. In this embodiment, a return call can be initiated before the virtual call reaches the first queue position, such that the caller may be connected with the call center when a next agent becomes free, or just prior to the next agent becoming available.

Continuing to block 304, the return call can be transferred to an available call center representative. In an illustrative embodiment, the return call can be transferred to a call center representative when the caller answers the return call. In another illustrative embodiment, the return call can be transferred to a call center representative when the return call is placed. In another illustrative embodiment, a prerecorded message can be communicated when the caller answers the return call, and the return call can be transferred to an agent after the prerecorded message is communicated. The method terminates at 340.

Returning to decision step 316, when the caller decides to schedule a time for the return call, the method moves to decision step 328, and it is determined whether caller identification information is received with the call. If caller identification information is not received, the caller can be prompted for a return call number at block 330, and the number can be received at block 332. In a particular embodiment, a caller may still enter an alternate return call number even if caller identification information is received. The method can then proceed to block 334.

Conversely, when caller identification information is received at decision step 328, the method also proceeds to block 334, and the caller can be prompted for a return call time. The time can include a number of days, hours and/or minutes after the initial call; a certain time of day, such as 4 p.m.; a range of time, such as between 6 p.m. and 7 p.m.; a list of times, e.g., 1 p.m., 3 p.m., or 5:30 p.m.; a calendar date, such as March 14; a range of calendar dates, such as from March 11 to March 14; a list of calendar dates, such as March 11, March 12 or March 15; or any combination of these, such as between 6 p.m. and 7 p.m. from March 11 to March 14. In an illustrative embodiment, the time can be indicated by the caller using one or more buttons of a keypad at the telephone from which the caller is calling. In another illustrative embodiment, the time can be indicated verbally by the caller.

Until the return call time that has been scheduled by the caller is reached, the call can be placed in a queue. Alternatively, the call can be placed in no call queue, and the scheduled time and return call number of the return call can be maintained in an information store. Moving to block 336, the return call time that has been scheduled by the caller is reached, and a return call is placed to the caller at block 338. In a particular embodiment, the return call can be placed to a telephone number identified by caller identification information, or the return call can be placed to a telephone number received from the caller.

In a particular embodiment, as shown at block 304, the return call is transferred to an available call center representative. In an illustrative embodiment, the return call can be transferred to a call center representative when the caller answers the return call. In another illustrative embodiment, the return call can be transferred to a call center representative when the return call is placed. In another illustrative embodiment, a prerecorded message can be communicated when the caller answers the return call, and the return call can be transferred to an agent, after the prerecorded message is communicated. The method terminates at 340.

Figure 4:
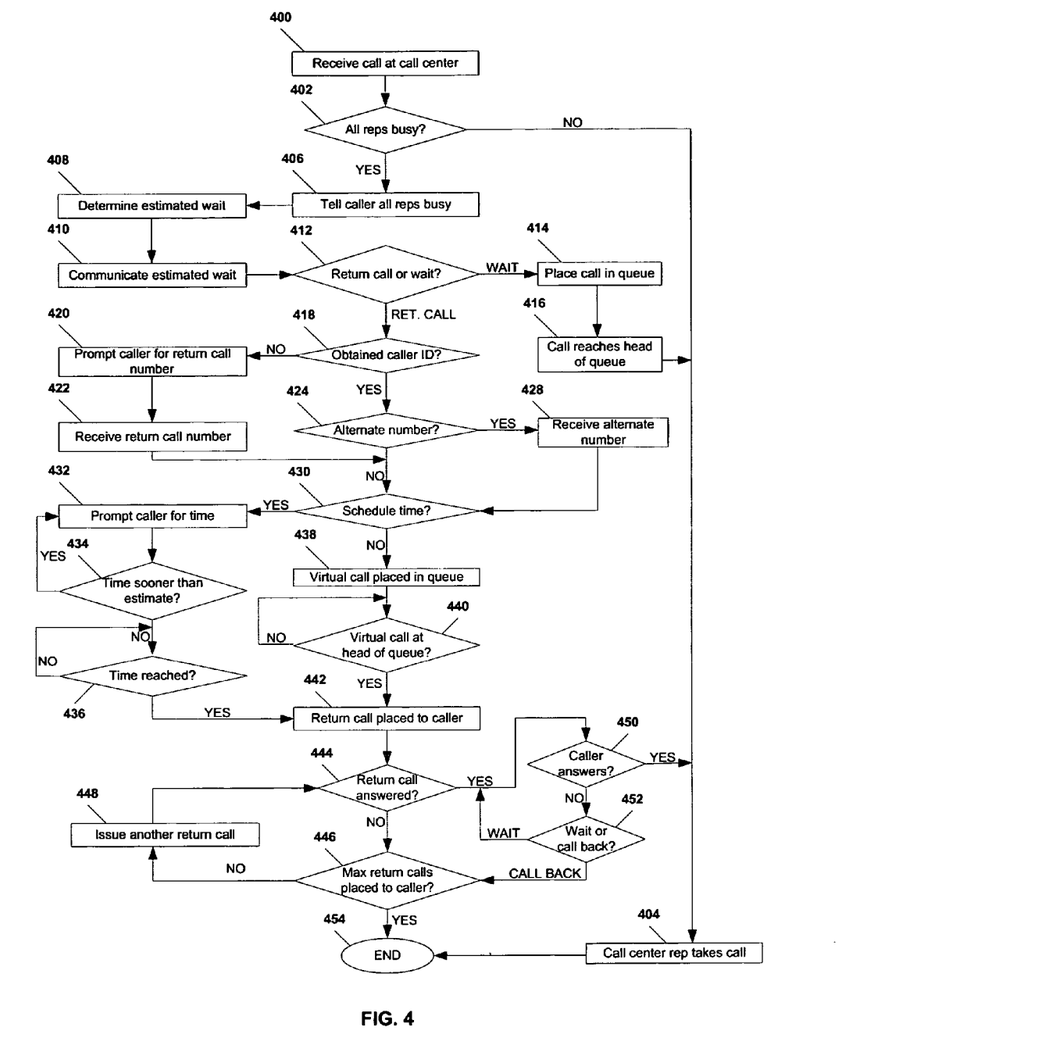
FIG. 4 is a flow diagram illustrating a second embodiment of a method of managing calls in a call center.

Referring to FIG. 4, a second method of managing calls in a call center is shown. At block 400, a call is received at a call center. At decision step 402, it is determined whether all representatives or agents in the call center are handling other calls. If an agent is available, the method proceeds to block 404 and the call is transferred to the available representative. Conversely, if all agents at the call center are busy handling other calls, the caller can be informed that all call center representatives are busy, as shown at block 406. In an illustrative embodiment, an estimated wait can be determined at block 408 and communicated to the caller at block 410.

Moving to decision step 412, the caller is prompted with a wait option and a return call option. When the wait option is selected by the caller, the call can be placed in a queue maintained by the call center, at block 414. As representatives answer other calls in the queue, the call advances toward a head of the queue. Eventually, the call reaches the head of the queue at block 416, such that it is the next call to be handled by a representative. The call is transferred to an available representative at block 304.

Returning to decision step 412, when the return call option is selected, the method can proceed to decision step 418. At decision step 418, it can be determined whether caller identification (caller ID) information relating to the caller is received with the call. In this embodiment, if no caller ID information has been obtained, the caller can be prompted for a return call number at block 420. The return call number can be received at block 422. In an illustrative embodiment, the return call number can be indicated by the caller using one or more buttons of a keypad at the telephone from which the caller is calling. In another illustrative embodiment, the return call number can be indicated verbally by the caller.

In an illustrative embodiment, if it is determined that caller ID information is received at decision step 418, the method can proceed to decision step 424. At decision step 424, the caller can be prompted to input an alternate number. If the caller wants to input an alternate number, the method moves to block 428 and the alternate number is received. In an illustrative embodiment, the alternate number can be indicated by the caller using one or more buttons of a keypad at the telephone from which the caller is calling. In another illustrative embodiment, the alternate number can be indicated verbally by the caller.

Moving to decision step 430, in a particular embodiment, the caller can be prompted to determine whether the caller wants to schedule a time for the return call. In this embodiment, when the caller decides to schedule a time for the return call, the method moves to block 432, and the caller can be prompted for a time. In an illustrative embodiment, the time can include a number of days, hours and/or minutes after the initial call; a certain time of day, such as 4 p.m.; a range of time, such as between 6 p.m. and 7 p.m.; a calendar date, such as March 14; or any combination of these. In an illustrative embodiment, the time can be indicated by the caller using one or more keys of a telephone from which the caller is calling. In another illustrative embodiment, the time can be indicated verbally by the caller.

Moving to decision step 434, it is determined whether the time received from the caller is sooner than the estimated wait communicated at block 410. If the time is sooner than the estimated wait, the method returns to block 432 and the caller is prompted for a time again. If the time is not sooner than the estimated wait, the method continues to decision step 436 and it is determined whether the scheduled time has been reached. When the scheduled time is reached, a return call is placed to the caller at block 442. If the scheduled time has not been reached, the method returns to decision step 436.

Returning to decision step 430, if a selection not to schedule a time for the return call is received, a virtual call that identifies the caller is placed in the queue at block 438. As each call that is ahead of the virtual call in the queue is answered by a call center representative, the position of the virtual call advances in the queue. At decision step 440, it is determined whether the virtual call has reached the head of the queue. When the virtual call reaches the head of the queue, such that it is the next call to be handled by an available agent, the method moves to block 442, and a return call is placed to the caller. Conversely, if the call is not at the head of the queue, the method returns to decision step 440.

Proceeding to decision step 444, it is determined whether the return call has been answered. If the return call is not answered, the method proceeds to decision step 446 and it is determined whether a maximum number of return calls has been placed to the caller. If the maximum number of calls has been placed, no additional return calls are placed and the method terminates at 454. Conversely, if the maximum number of return calls has not been placed, the method proceeds to block 448 and another return call can be issued to the caller.

In a particular embodiment, the other return call can be issued at a pre-defined time after the previous call. For example, the other return call can be issued five minutes after the previous return call. In another example, the other return call can be placed after a predefined number of agents have answered other calls, such as after three agents have been passed. In one embodiment, the other return call can be placed to the same telephone number to which the previous return call was issued. In another particular embodiment, the other return call can be issued to an alternate telephone number received from the user, e.g., at block 428. When another return call is issued, the method returns to decision step 444 and it is determined whether the call has been answered.

Returning to decision step 444, if the return call is answered, the method proceeds to step 450. At decision step 450, it can be determined whether the party answering the return call is the party that issued the call to the call center. In one embodiment, a prerecorded message can be communicated when the return call is answered, which asks if the answering party is the initial caller. The answering party can speak 'yes' or 'no,' or press keys on a phone corresponding to similar responses, such as 'one' for 'yes' or 'two' for 'no.'

If the party that answers the return call is the initial caller, the method can proceed to block 404, and the return call is transferred to an available call center representative. The method then terminates at 454. Returning to decision step 450, if the party that answers the return call is not the initial caller, the method can continue to decision step 452, and the answering party can be provided with a wait option or a call back option. For example, if the original caller's children or spouse answers the phone, and the caller is available to receive the return call, the answering party can select the wait option. The answering party can then join the return call. Alternatively, if the initial caller is not at the location where the return call is received, or if the caller is not immediately available, the answering party can select the call back option.

At decision step 452, if the answering party selects the call back option, the method can return to decision step 446. Whereas, if the answering party selects the wait option, the method returns to decision step 450. When the caller joins the return call, the method can move to block 404, and the return call can be connected to a call center representative. The method terminates at 454.

Figure 5:
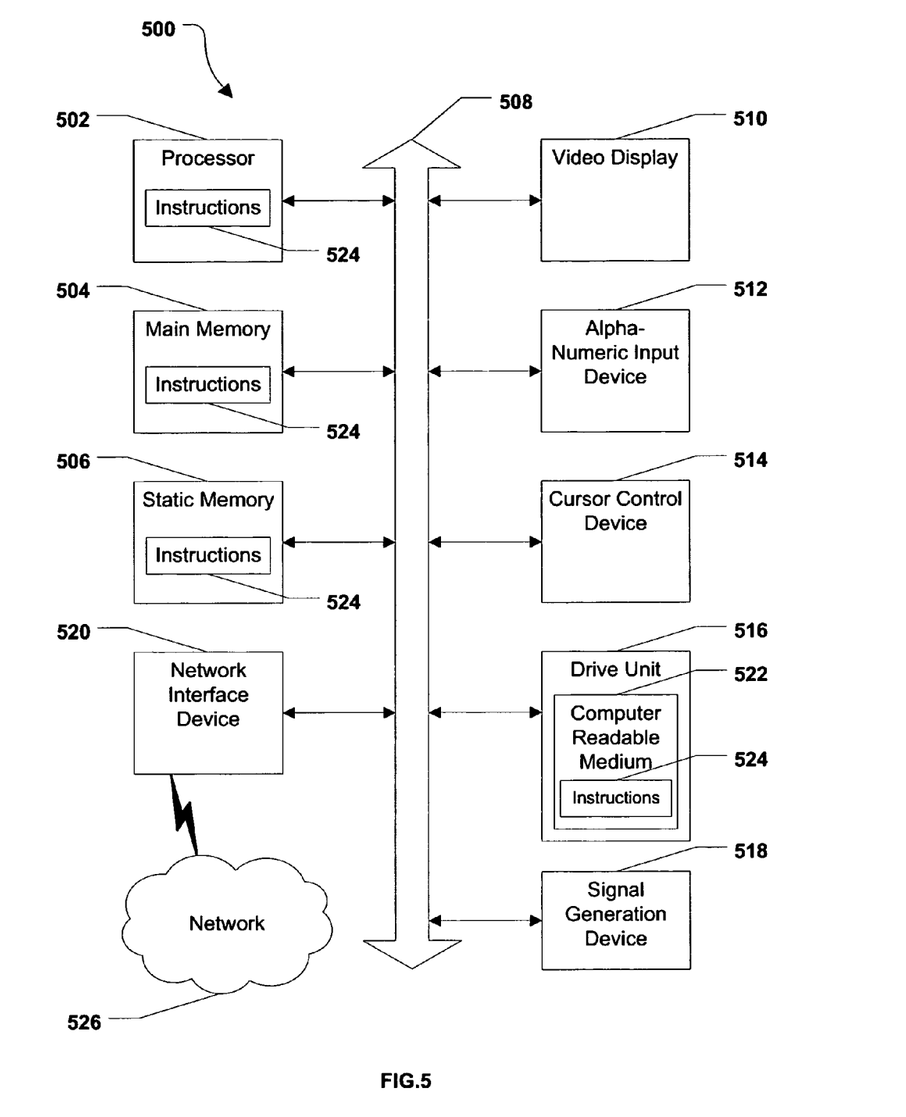
FIG. 5 is a diagram of one embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices. For example, as shown in FIG. 1, the computer system 500 can be a server connected with network aggregate devices, caller telephones, and call center agent telephones.

In a networked deployment, the computer system may operate in the capacity of a server, e.g., the server 102 in FIG. 1, as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed enable call centers to manage calls, while providing convenience for callers. Customers can do other things while they wait for representatives to become available. Allowing the customer to hang up and get a call back when an operator is available puts a measure of control back in customers' hands. The system and method disclosed also allow for a more efficient method of call center human resource scheduling and allocation. Typically a call center is trying to maintain a "below xx minute" wait time. This requires complex scheduling of human resources and a detailed knowledge of inbound call patterns. With the system and method disclosed, staffing levels could be somewhat uniform, since the on hold time of customers would not need to include those who are in the virtual queue. This would be particularly beneficial during unforeseen spikes in inbound calls. Additionally, the system and method disclosed can reduce the number of active lines and ports in a call center, as virtual calls do not take up an available circuit and port.

In an illustrative, non-limiting embodiment, the system and method disclosed herein can be used to pre-queue calls when a call center is not staffed or busy. This embodiment would allow call centers to preview a load at the call center. For instance, a caller may be presented with an option to receive a return call, even if agents are available. When a party who needs information from a call center expects to be available to call the call center at a future time, the party or their representative can schedule a return call for the future time when the party expects to be available. An administrative assistant, for example, could schedule such return calls for executives, such that the executives do not have to make time both to call the call center and for a return call. Rather, the executive can schedule a single available time and receive the desired information.

Similarly, a caller may use the system and method to pre-queue a return call when a call center is not staffed. For example, a party or the party's representative can call the call center after business hours. As described with reference to block 308 in FIG. 3, for instance, the caller can be informed of the next time that the call center will be staffed. The caller can schedule a return call for a future date and time when the call center will be staffed. Thus, the caller only has to schedule a single time to communicate with the call center.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing calls at a call center, the method comprising:
    receiving a first call from a caller at a processor of the call center;
    identifying, with the processor, a first telephone number associated with the first call;
    transmitting, from the processor, an estimated wait time to the caller;
    sending a wait option and a receive return call option from the processor to the caller;
    sending a schedule return call option when the caller selects the receive return call option from the processor to the caller, wherein the schedule return call option comprises a prompt to select a range of times for a callback and a prompt to input a second telephone number;
    placing at least one second call directed to the first telephone number from the processor;
    in response to determining at the processor that the at least one second call is answered by a party that did not place the first call, providing the party with a second wait option and a second receive return call option from the processor; and
    in response to determining at the processor that the at least one second call is unanswered, placing a third call directed to the second telephone number from the processor.

2. The method of claim 1, further comprising placing a virtual call in a queue when the caller selects the return call option, but does not select the schedule return call option, wherein the virtual call identifies the caller and holds a place in the queue for the caller.

3. The method of claim 2, wherein the at least one second call is initiated when the virtual call moves to a first position in the queue.

4. The method of claim 2, further comprising predicting that a call center agent will be available within a time period, wherein the at least one second call is initiated when the time period is less than or equal to a predefined time.

5. The method of claim 1, further comprising:
    receiving a scheduled time from the caller; and
    determining whether the scheduled time is before the estimated wait time elapses.

6. The method of claim 5, further comprising:
    issuing a return call to the caller at the scheduled time if the scheduled time is after the estimated wait time elapses; and
    prompting the caller for another scheduled time if the scheduled time is before the estimated wait time elapses.

7. The method of claim 1, wherein multiple calls are directed to the second telephone number.

8. The method of claim 5, wherein the scheduled time includes at least one of the following: an amount of time after the first call is received from the caller; a time of day; a list of times of day; a calendar date; and a list of calendar dates.

9. The method of claim 1, further comprising receiving data from the caller, the data identifying the second telephone number.

10. The method of claim 1, wherein placing the at least one second call comprises placing an initial call and placing at least one subsequent call, the method further comprising:
determining that the initial call is unanswered; and
placing the at least one subsequent call after determining that a predefined number of agents have serviced other calls since the initial call was placed.

11. The method of claim 1, further comprising connecting an agent communication device to a return call issued to the caller.

12. The method of claim 1, further comprising transferring an agent communication device to a return call issued to the caller after the return call is answered by the caller.

13. The method of claim 1, further comprising:
communicating a prerecorded message after a return call issued to the caller is answered by the caller; and
connecting an agent communication device to the return call after the prerecorded message is communicated.

14. The method of claim 1, further comprising:
receiving input from the party indicating selection of the second return call option;
in response to determining that another call of the at least one second call is answered by a non-caller that did not place the first call, providing the non-caller with a third wait option and a third receive return call option;
receiving input from the non-caller indicating selection of the third wait option;
in response to the input indicating selection of the third wait option, waiting a time period; and
connecting the caller to an agent communication device.

15. The method of claim 1, further comprising communicating to the caller a next date and a next time at which a caller center is to be staffed to service the caller.

16. A system to manage calls in a call center, the system comprising:
a server having a processor and a memory accessible to the processor; and
a computer program stored in the memory, the computer program comprising instructions executable by the processor to:
receive a first call from a caller;
identify a first telephone number associated with the first call;
transmit an estimated wait time to the caller;
prompt the caller with a wait option and a receive return call option;
prompt the caller with a schedule return call option when the caller selects the receive return call option, wherein the schedule return call option comprises a prompt to select a range of times for a callback and a prompt to input a second telephone number;
place at least one second call directed to the first telephone number;
provide a second wait option and a second receive return call option in response to determining that the at least one second call is answered by a party that did not place the first call; and
place a third call directed to the second telephone number in response to determining that the at least one second call is unanswered.

17. The system of claim 16, wherein the instructions are further executable by the processor to:
place a virtual call in a queue when the caller selects the receive return call option, but does not select the schedule return call option, wherein the virtual call identifies the caller and holds a place in the queue for the caller; and
initiate the at least one second call when the virtual call moves to a first position in the queue.

18. The system of claim 16, wherein the instructions are further executable by the processor to:
receive a scheduled time from the caller; and
determine whether the scheduled time is before the estimated wait time elapses.

19. The system of claim 18, wherein the instructions are further executable by the processor to issue a return call to the caller at the scheduled time when the scheduled time is after the estimated wait time elapses.

20. The system of claim 18, wherein the instructions are further executable by the processor to prompt the caller for another scheduled time when the scheduled time is before the estimated wait time elapses.

21. A computer-readable storage device comprising instructions that, when executed by a processor, cause the processor to perform operations comprising:
receiving a first call from a caller;
identifying a first telephone number associated with the first call;
determining whether all agents at a call center are busy;
transmitting an estimated wait time to the caller;
prompting the caller with a schedule return call option;
prompting the caller to select a range of times for a callback and to input a second telephone number in response to the scheduled return call option being selected;
placing at least one second call directed to the first telephone number;
in response to determining that the at least one second call is answered by a party that did not place the first call, providing the party with a second wait option and a second receive return call option; and
in response to determining that the at least one second call is unanswered, placing a third call directed to the second telephone number.

22. The computer-readable storage device of claim 21, wherein the operations further comprise:
prompting the caller for a scheduled return call time when the scheduled return call option is selected; and
receiving the scheduled return call time.

23. The computer-readable storage device of claim 22, wherein the operations further comprise:
prompting the caller to select an input scheduled time or an end of estimated wait time option; and
wherein the scheduled return call time is the end of the estimated wait time when the caller selects the end of estimated wait time option.

* * * * *